UNDERGROUND ANTENNA

Filed Sept. 9, 1966 3 Sheets-Sheet 1

INVENTOR
Gregory J. Harmon
BY [signature]
ATTORNEYS

INVENTOR
Gregory J. Harmon
BY Bonnie, Edwards, Morton, Taylor & Adams
ATTORNEYS

INVENTOR
Gregory J. Harmon
BY
Pennie Edmonds Morton Taylor & Adams
ATTORNEYS

United States Patent Office 3,346,864
Patented Oct. 10, 1967

3,346,864

UNDERGROUND ANTENNA

Gregory J. Harmon, Sudbury, Mass., assignor to Northrop Corporation, Beverly Hills, Calif., a corporation of California Filed Sept. 9, 1966, Ser. No. 578,407
9 Claims. (Cl. 343—719)

This application is a continuation-in-part of application Ser. No. 342,687 filed Feb. 5, 1964, now abandoned.

The present invention relates to communication systems and particularly to a highly efficient buried antenna system which may be rendered immune to military bombardment.

It has become a matter of prime importance in defense to provide "hardened" sites for our missiles. Because the philosophy of the use of these weapons is one of retaliation, it is obvious that they must, insofar as possible, be protected against the first onslaught. Protection of the weapons alone, however, would be of minimal value if command communications or communications between sites were lost. It is, therefore, with hardened communication sites that the present invention is primarily concerned, although the invention has great value and applications independent of military considerations.

In military installations, as well as others, the frequency used for communication depends on many factors. Consequently capability of designing antennas for given frequencies within a wide range is important. Antenna systems of the present invention can be designed for use at very low frequencies in the low kilohertz range up to very high frequencies of the order of 50 megahertz or more, thus fulfilling a wide variety of communication needs.

At very low frequencies antennas become very long and structurally impractical when erected in conventional manner. The present invention permits the use of much shorter antennas for a given frequency, with practical means of support, while at the same time providing protection from damage.

Broadly considered, the present invention stems from the concept of embedding an antenna in a mountainside. From a very early date, the idea of burying antennas in the earth has been considered. The advantages of such designs over conventional antenna towers are several. Weather disturbances such as tornadoes, hurricanes, heavy snow or ice storms and their damaging effects are avoided, as are the effects of such military action as shelling or bombing. However, buried antennas suggested heretofore have not been sufficiently satisfactory to be acceptable.

In one type of system heretofore suggested, a pair of antennas are buried and propagation therebetween is wholly sub-surface. In such a system the signal becomes attenuated so rapidly, and the noise level is so high that only short range communication is possible.

There have also been proposed systems which, while still contemplating the embedment of an antenna, further suggest the launching of a surface wave into the adjacent air. These systems have also been conspicuously unsuccessful for a variety of reasons. Chief among the reasons has been the use of relatively flat terrain for the antenna emplacement.

At the interface between ground and air, the basic effects of refraction come into play. With, for example, a dipole disposed generally horizontally beneath flat terrain, the maximum component of radiation in the air above is in a vertical direction and is not refracted. At smaller angles refraction takes place, until a point is reached where internal reflection occurs. Below about 25° to the horizontal the radiation vector begins to decrease rapidly, and at around 10° the reduction becomes quite severe. The radiation vector continues to decrease as the angle approaches the horizontal and theoretically reaches zero at the horizontal. Thus the radiation pattern makes the antenna very inefficient and nearly useless for long distance communication.

Moreover, flat terrain proposals have commonly involved the embedment of the antenna in conductive earth which causes large dissipative losses, particularly at low frequencies. In addition, the high losses prevent resonance in the antenna unless special precautions are taken to insulate it from the surroundings, in which case interface losses seriously reduce efficiency. Also, in typical flat terrain, the earth exhibits a relatively high dielectric constant characteristic of earth of relatively high conductivity. Hence the effect of refraction at the interface is quite severe, and limits the amount of energy which can pass the interface into the air above.

In accordance with the present invention, a resonant antenna is buried in the rock sub-surface of a mountain or large hill having a substantial slope in the desired azimuth direction for transmission or reception. In general the surface slope should be greater than about 10°, and a 20° slope has been employed with excellent results. The antenna is positioned and oriented so that its radiation pattern has a major lobe directed toward the surface slope and yields a refracted beam in air having near-maximal radiation vectors at small angles to the horizontal in the desired azimuth direction. The rock sub-surface is advantageously a dense rock mass having low conductivity, forming essentially a dielectric rock mass. The electrically conductive surface of the antenna is placed closely adjacent the sub-surface rock, and preferably in contact therewith, so that the antenna is closely coupled to the rock. As a result, the dielectric constant of the rock reduces the physical length of the antenna for resonant operation at a given frequency. The depth at which the antenna is buried is preferably at least approximately one-tenth wavelength in the medium (rock) at the operating frequency, and may be considerably greater if desired for adequate hardening.

These and other features of the invention will be explained more fully hereinafter.

In the drawings:

FIGS. 1(*a*) and 1(*b*) show the radiation pattern of a dipole in air;

Figure 1:
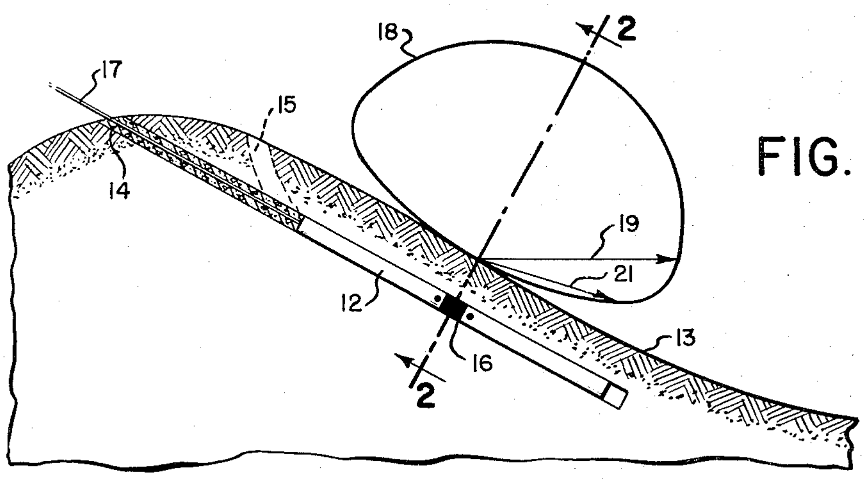
FIG. 1 is a schematic view of an antenna embedded in a borehole in a mountainside, with the radiation pattern thereof.

In FIG. 1, a simple embodiment of an antenna constructed in accordance with the invention is shown. A linear dipole 12 is embedded in a mountainside generally parallel to the sloping surface 13. The method of embedment depends on practical considerations. As indicated by the solid lines from the point 14 and the dashed lines from the point 15 on the surface of the mountain, holes may be drilled either linearly, or through an arc of relatively large radius to the desired depth followed by linear drilling.

The antenna 12 is preferably fabricated from flexible metal tubing which can be inserted through the straight or curved borehole until it reaches the desired position. Of course, the antenna need not be flexible if the straight borehole insertion is used. In either case, the central portion 16 is of suitable insulating material to separate the conductive sections of the antenna and form a dipole. A coaxial feed line 17 from the transmitter or receiver will normally be connected to the antenna sections adjacent the central portion 16, and may pass through one section as shown.

If deeply embedded, the radiation pattern in the rock of dipole 12 may be considered to be similar to that of a dipole in air. The pattern is directional lateral to the dipole as shown in FIG. 1(*a*), with maximum radiation perpendicular thereto. About the dipole, the pattern is non-directional as shown in FIG. 1(*b*). When less deeply embedded, the pattern may depart somewhat from that shown. However, a major lobe will in general extend laterally from the dipole. As is clear from FIG. 1, this major lobe is directed toward the surface slope 13.

Due to refraction at the ground-air interface, the radiation pattern in space will be quite different from that of a dipole in air. An idealized pattern in a vertical plane including the dipole is shown at 18. The ray perpendicular to the surface slope will not be refracted, but other rays will. In general, the radiation vector decreases in amplitude as its angle to the perpendicular increases, at first slowly and then more rapidly. The surface slope here shown is 27½°, and the length of the horizontal vector 19 is only slightly less than the perpendicular vector. Thus radiation horizontally and at angles above the horizontal is near maximal, and suitable for communication by either direct wave transmission or by reflection from the ionosphere.

If the surface slope were less, the horizontal vector would diminish. Thus for a 10° slope the vector 21 would become horizontal, and it is evident the horizontal radiation would markedly decrease. However, vector 19 would then be 17½° above the horizontal, suitable for long distance communication via the ionosphere. Thus the choice of surface slope will in part depend on the type of communication required. The orientation of the antenna 12 with respect to the surface slope will also affect the radiation pattern, as will be discussed later.

Figures 1A, 1B, 2, 3:
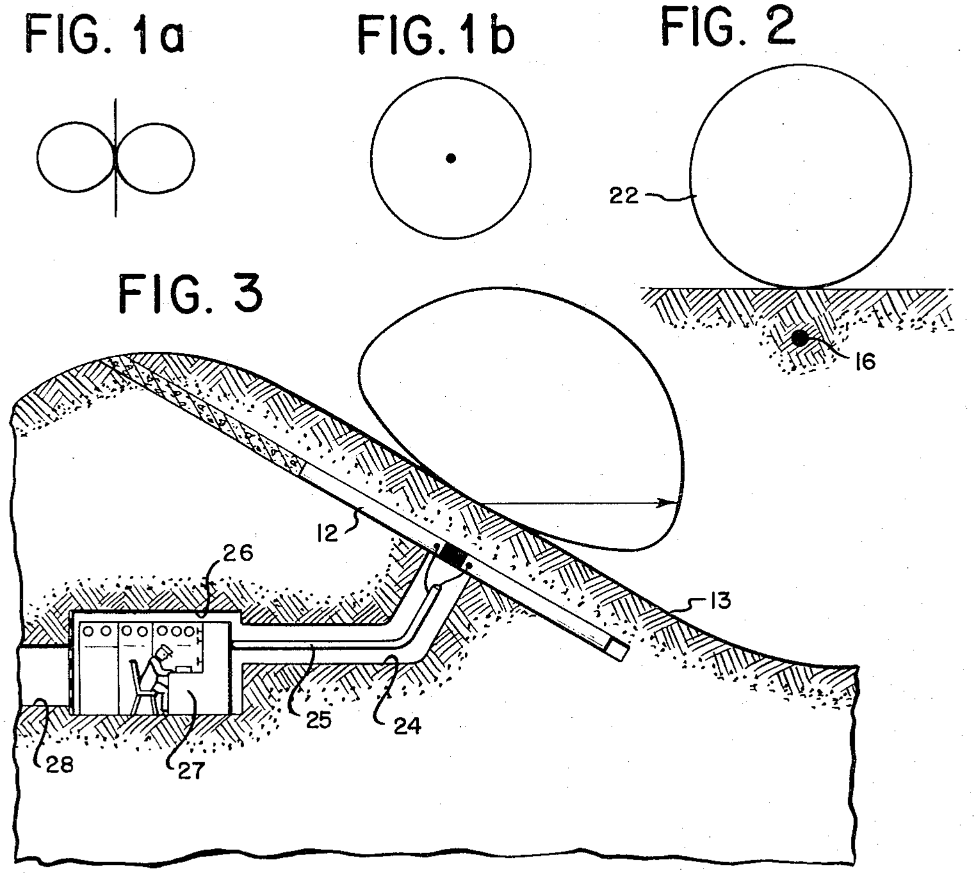
FIG. 2 shows the radiation pattern from the direction 2—2 in FIG. 1.
FIG. 3 is a schematic view of an alternative embodiment of a communication system similar to that of FIG. 1.
Figure 11:
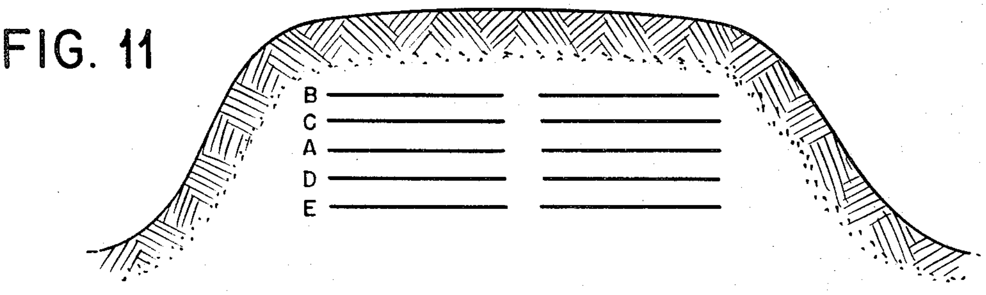
FIG. 11 is a schematic view of a broadside array of horizontally embedded antenna elements.

FIG. 2 shows the radiation pattern 22 in a plane at right angles to that of FIG. 11. Due to refraction at the ground-air interface, the pattern is no longer omnidirectional in this plane, as it would be for a dipole in free space. Taking FIGS. 1 and 2 together, the overall radiation pattern can be visualized as egg-shaped.

The patterns shown in FIGS. 1 and 2 are the result of theoretical calculations based on a uniform medium of given dielectric constant, infinite smooth ground plane, etc. Hence considerable departure therefrom may be expected in practice. Nevertheless, they suffice for purposes of explanation.

Considering now the embedment of the antenna and the effect of the rock thereon, a dense, crystalline rock subsurface is commonly found in mountains beneath the surface layer of soil, trees, weathered rock, etc. Such subsurface rock is of low conductivity and has a dielectric constant considerably lower than surface layers of conductive earth. The dielectric constant varies with frequency, and depends somewhat on the specific composition of the rock. Measurements indicate that the dielectric constant, relative to air, varies from around 4 in the HF range (3–30 megahertz) to around 50 in the VLF range (3–30 kilohertz). Thus a resonant antenna such as a dipole or monopole will have a considerably shorter physical length for a given resonant frequency when embedded in rock in close coupling relationship.

This foreshortening effect can be understood from the following discussion. The length in air of a resonant antenna such as a dipole or monopole depends upon the dielectric constant or capacitivity $\epsilon_0$ and the permeability or inductivity $\mu$ of air. These are:

$$\epsilon_0 = 8.85 \times 10^{-12} \text{ farad/meter} \quad (1)$$

$$\mu = 1.26 \times 10^{-6} \text{ henry/meter} \quad (2)$$

Sub-surface rock has a higher dielectric constant than air, and may be expressed as $\epsilon_r\epsilon_0$ where $\epsilon_r$ is the relative dielectric constant for which values have been given above. The permeability of sub-surface rock, however, is substantially the same as air except for isolated mineral bodies.

The phase velocity V and wavelength $\lambda$ for a resonant antenna can be obtained by considering the antenna to be a section of a transmission line. For a transmission line with negligible losses:

$$V = \frac{1}{\sqrt{LC}} \quad (3)$$

where L and C are the inductance and capacitance per unit length of the line, respectively.

Since $V = f\lambda$, where $f$ is frequency:

$$\lambda = \frac{1}{f\sqrt{LC}} \quad (4)$$

In air or free space $L = \mu$ and $C = \epsilon_0$. However, in subsurface rock, $C = \epsilon_r\epsilon_0$. Thus the phase velocity $V_r$ and wavelength $\lambda_r$ in rock become:

$$V_r = \frac{1}{\sqrt{\mu\epsilon_r\epsilon_0}} \quad (5)$$

$$\lambda_r = \frac{1}{f\sqrt{\mu\epsilon_r\epsilon_0}} \quad (6)$$

Thus both the phase velocity and wavelength are reduced by the factor $\sqrt{\epsilon_r}$ in rock as compared to air.

The effect of the dielectric constant of the sub-surface rock on the resonant length of the antenna is due to the rock being in the near-field of the antenna. The near field decreases rapidly with increasing distance from the antenna. Hence it is advantageous to have the conductive surface of the antenna substantially in contact with the rock, so as to be closely coupled thereto and excite the rock directly.

This foreshortening is particularly important for resonant antennas operating at very low frequencies, where their length in air is excessive, and where tall towers are required to support the antenna an appreciable distance above the surface (say ⅛ wavelength or more). For example, at 100 kilohertz a half-wave dipole in air would be about 5000 feet long. With an $\epsilon_r$ of 16, as has been measured at that frequency, the antenna in rock would be only one-quarter as long. For an $\epsilon_r$ of 9, such as might obtain at a somewhat higher frequency, the rock embedded antenna would be one-third as long. For lower frequencies where $\epsilon_r$ approaches 50, the advantage is still greater.

A further factor may be mentioned. Sub-surface rock, although of low conductivity, does introduce losses which lower the Q of the antenna as compared to free air. Thus bandwidths between 3 db points of the order of 50% of the resonant frequency have been measured in the HF range. Accordingly dipoles shorter than a half-wavelength in the rock medium may frequently be employed. With the bandwidth given, dipoles of the order of 0.3 wavelength may be used without substantial loss in signal strength, and even shorter dipoles may be satisfactory.

The depth of embedment involves several factors. For very shallow embedments near the interface, the antenna radiation resistance becomes very low, which is undesirable. Also reflection and refraction effects and changes in the fields around the antenna deteriorate performance. An embedment depth of about one-tenth wavelength in the medium, or more, is desirable. Embedments of the order of one-quarter wavelength or more have been used with success. The antenna should also be below any weathered rock layer whose properties would change with rain, and also be lossy. Very deep embedments will results in decreased efficiency, due to losses in the sub-surface before the radiation reaches the interface. The degree of "hardening" desired plays a part, and may require a compromise with efficiency of radiation.

As an example, a dipole embedded at a depth of 25–30 feet and parallel to a surface slope of about 20°, operating at a frequency in the range of 5–15 mHz., may be expected to give satisfactory results and at the same time will be well protected.

In FIG. 1 the dipole 12 is parallel to the general slope of surface 13. However, other orientations are possible. Thus a horizontal disposition has been found to give good results in practice, as will be described in connection with FIG. 4. The orientation will determine the angle at which the maximum vector in the major lobe approaches the surface. This angle, together with the refractive index at the operating frequency and the surface slope, will be important in determining the lowest angles at which near-maximal radiation vectors are present.

In addition to depth of embedment, several other natural effects must be considered. In a borehole in a mountain, ground-water may be encountered. The resistivity of such ground-water is frequently as low as one to ten meter-ohms. If present on the surface of the antenna, skin losses will damp antenna currents and may destroy normal resonance and radiation efficiency. Also, in order to insert the antenna into a water-filled hole, it may be necessary to permit the flow of ground-water through the antenna tubing. Since ground waters have dielectric constants of the order of 80, a heavy capacitive load will then be placed upon the antenna. To overcome this problem, sealants may be applied to the borehole walls to exclude water. Also, to minimize the space between the antenna and the borehole walls, both to exclude ground-water and to maximize coupling of the antenna to the rock, a mandrel could be run through the antenna to expand the tubing against the wall.

FIG. 3 illustrates another embodiment of the invention in which an alternative feeding method for the antenna and various other features are shown. The antenna may be inserted through a borehole as in FIG. 1, and the borehole then filled in. A tunnel 24 is provided for entry of the coaxial feed line 25. A chamber 26 is opened within the mountain to provide maximum protection for personnel and the transmitting and receiving components 27. Communication with other personnel, equipment or a missile site may be provided by way of a continuation 28 of the tunnel.

Center feed need not be from within the mountain, of course. At the loss of hardening, the feed can be directly to the center of the dipole through a tunnel drilled more or less horizontally from the radiating side of the mountainside.

Figures 4, 5, 6, 7, 8:
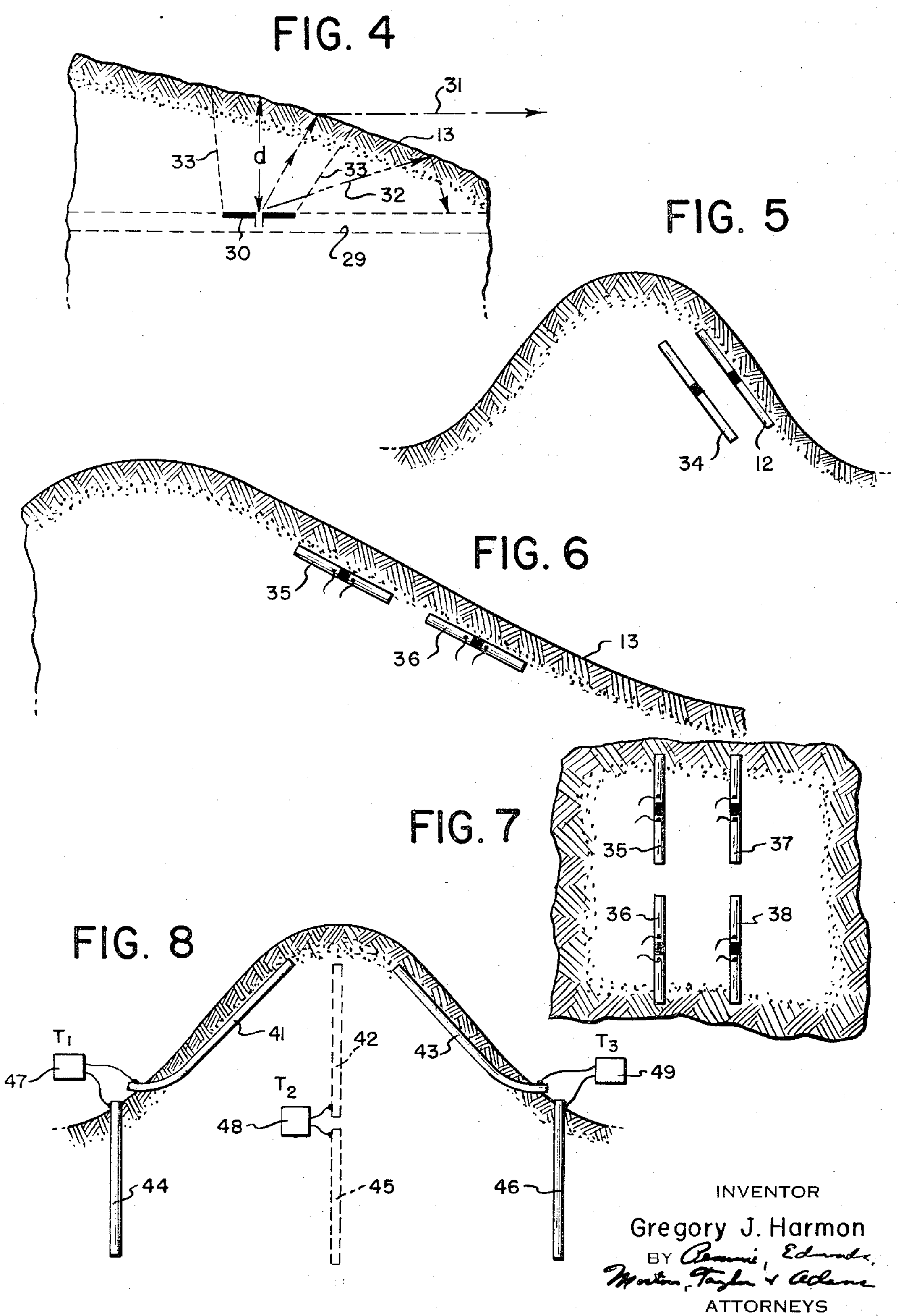
FIG. 4 is a modification of the arrangement of FIG. 1.
FIG. 5 is a schematic view of an antenna and a cooperating reflector.
FIGS. 6 and 7 show the use of an array of dipoles, FIG. 7 being a face view of FIG. 6.
FIG. 8 is a schematic view of an omnidirectional antenna system.

FIG. 4 shows an actual test arrangement. A mountain having an existing generally horizontal tunnel 29 through the rock sub-surface was selected, and a dipole antenna 30 attached to the roof thereof. For convenience, copper foil was employed and cemented to the roof. The tunnel was closed at either end by means not shown, to prevent direct radiation down the tunnel to outside space.

The average surface slope above the antenna was about 20°. Ray 31 illustrates refraction of radiation from the antenna to a generally horizontal direction in the forward direction of slope 13. Ray 32 illustrates an oblique ray which is internally reflected. Lines 33 represent an emergence zone which will be discussed later.

Three different operating frequencies were employed in the tests, with antennas of appropriate length. Field strength measurements were made at a distance of about 400 miles in the forward direction of slope 13, and referred to the theoretical field strength at that distance which would be produced by an ideal monopole fed with the same power.

With a 55-foot antenna at a depth $d$ of 65 feet, operating as a half-wave dipole at 3.5 mHz. (megahertz), the relative field strength was about −12 db. A 24-foot antenna at a depth of 27 feet operating as a half-wave dipole at 7.2 mHz. produced a relative field strength of −14 db. A 45-foot antenna at a depth of 65 feet, operating as a $3\lambda/2$ antenna at 14 mHz. yielded relative field strengths of the order of −15 db to −18 db. As will be understood by those skilled in the art, there are excellent results for buried antennas.

Actual communications tests were also conducted and showed that long distance communication was entirely feasible. For example, with about 5.5 kilowatts input at 14.2 m.H.z., preferably readable good voice signals were picked up 1500 miles away, and CW signals at considerably greater distances.

Field strength measurements were also made at the surface over the antenna to determine the emergence zone of high relative field strength, indicated by the dash lines 33. Contours of equal field strength were then plotted. The contours were of course rather irregular since the surface was not an ideal plane nor could the sub-surface be assumed to be uniform over the area. However, the contours of highest field strength were narrower along the slope than lateral thereto. A field strength of 5.0 mv./m. was the highest recorded. Maximum distances enclosed by the 4.0, 3.0, 2.0 and 1.0 mv./m. contours along the slope were about 60, 110, 180 and 220 feet, respectively, and across the slope were about 115, 160, 210 and 270 feet, respectively. Thus the emergence zone was well within the area of the surface slope utilized.

The position of the emergence zone on the slope depends on the position and orientation of the antenna with respect to the slope, as will be understood from the foregoing. For long distance communication it is desirable to correlate these factors so that the emergence zone is above the terrain in the desired direction of radiation.

The above measurements were made with the antenna used as a transmitting antenna. By the well-known reciprocity law for antennas, the characteristics of a given antenna apply equally well when the antenna is used for either transmission or reception. Thus an antenna used primarily for reception may be considered to have a radiation pattern, emergence zone, etc. and the above discussion applies thereto.

The above results are not necesarily optimum, since existing tunnels, etc. were used. Nevertheless, they clearly show the practicability of the invention.

Instead of a simple dipole, other and more elaborate antennas producing more directional patterns may be employed if desired.

FIG. 5 illustrates an embodiment in which a reflecting dipole 34 is utilized in conjunction with the primary radiator 12 for intensifying radiation. The general configuration of the large hill or mountain and the positioning of the primary radiating element 12 may be the same as that shown in FIG. 1 and described hereinabove. A steeper surface slope is here shown, so as to improve low angle coverage with the more directive pattern resulting from the use of a reflector. The method of insertion or embedment may be the same or similar to those described in connection with FIGS. 1 and 3. The drill holes or excavations for the dipole 34 and the dipole 12 are made to place the two diploles in a roughly parallel arrangement. The dipole 34 is disposed a distance $d$ behind and in the same vertical plane as the dipole 12. The reflecting dipole is, of course, more deeply embedded in the rock mass of the mountainside.

The distance $d$ is not critical, but it should be approximately $0.1\lambda_r$ to $0.25\lambda_r$ and may, in some cases where medium and high frequencies are used, be as great as $0.5\lambda_r$.

Two advantages are obtained by using the reflector. First, the radiation directed horizontally out of the mountainside is increased over a broad range of azimuth; and second, the horizontal or azimuthal radiation pattern may be adjusted to a considerable extent. The first advantage is, of course, the more important, and there is also derived the incidental benefit of suppression of the radiation back into the mountain which is encountered when only a primary radiator is used. Moreover, if both dipoles are driven, the intensity of the horizontally directed wave may be maximized by adjustment of the relative time phase of the currents fed to the dipoles 12 and 34, if those currents are maintained equal. With the dimensions of *d* as indicated above, the maximum intensity would be obtained with an antiphase relation between the two currents of about 135° to 180°. If the dissipative loss through the dense rock amounts to about a decibel, the increase of horizontal directivity would reach about 3 to 4 decibels. This is equivalent to increasing transmitter power by a factor of 2.0 to 2.5. Obviously, this gain could be most important in the reduction of transmitter cost, power consumption, maintenance, cooling, and many other problems when extremely high power is being transmitted.

FIGS. 6 and 7 show an array of four driven dipoles arranged in two coaxial pairs 35, 36 and 37, 38 embedded side-by-side. The array may be generally parallel to the surface slope 13, as shown, or may be oriented more horizontally, or even more vertically, as discussed above in connection with FIG. 1. The spacing and phase of driving the dipoles may be selected to cause the resultant major lobe to impinge on the interface at the desired angle. This arrangement permits shifting the major lobe both in the vertical plane including a pair of dipoles, and in a plane at right angles thereto. The resulting radiation pattern will in general be more directive than that shown in FIGS. 1 and 2 and the pattern may be adjusted both in elevation and in azimuth.

If desired, antennas using other than dipoles can be employed. FIG. 8 shows the use of monopoles in an array where azimuthal transmission may be increased even to 360° coverage. A multiplicity of primary monopole radiators 41, 42, 43 may be embedded in boreholes or otherwise installed in a generally circular arrangement about a mountain. Additional elements 44, 45, 46 may be placed in vertical boreholes adjacent the foot of the mountain. These elements serve the same purpose as grounding screens in more conventional monopole installations. A length of $0.25\lambda_r$ to $2.50\lambda_r$ for the primary radiators is most effective. The elements 44–46 may be of length comparable to that of the elements 41–43, but do not serve as radiators. The transmitters $T_1$, $T_2$ and $T_3$, also legended 47–49, respectively, may be connected as shown.

If desired, the monopoles 41–43 could be replaced by dipoles, and the counterpose elements 44–46 omitted.

An omnidirectional radiation pattern may be established, utilizing such radiating elements and, ideally, the pattern would be circular in a horizontal plane. However, to assure a near circular pattern, it may be necessary to add to the number of primary radiators in order that the patterns of adjacent radiators will overlap appreciably.

Figure 9:
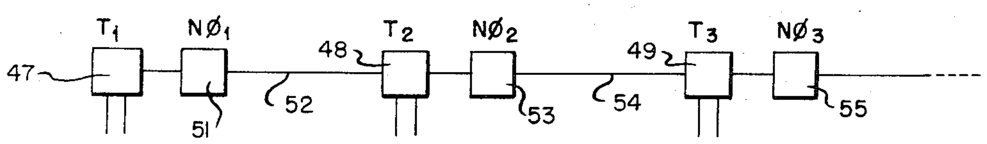
FIG. 9 is a block diagram of a system for linking antenna elements of an array.

One other consideration is involved in the realization of an omnidirectional pattern. This is a system for maintaining phase coherence in the multiple-element array, and this system is illustrated in FIG. 9. Such control of phase must be maintained to avoid null or near-null indentations in the circular pattern. Assuming that the antenna current phase for any individual transmitter such as $T_1$ is sampled, this signal may be fed through a continuously adjustable phase shifting network 51, then by either wire or radio link 52 to a phase control element, preferably in a low-level R.F. stage of the next adjacent transmitter such as $T_2$. The point of application in the transmitter could be a master oscillator, buffer amplifier, frequency multiplier, or the like having a tank circuit phase-controlled by an electronic phase-shifter. In similar fashion, $T_2$ could be tied through a phase-shifting network 53 and link 54 to the transmitter $T_3$, thence to subsequent transmitters in similar manner.

Figure 10:
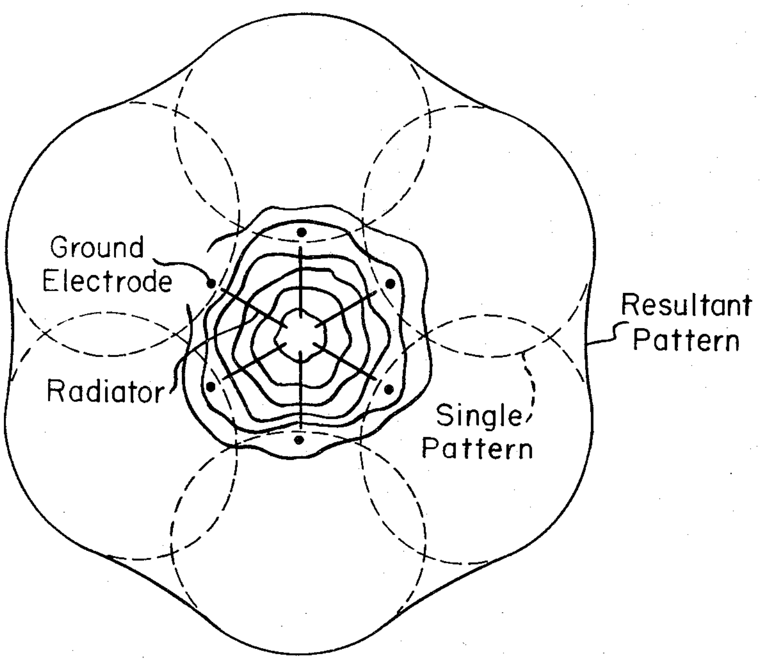
FIG. 10 is a representation of a pattern of radiation obtained with a circular antenna array.

The phase of any of the manually operated phase shifters 51, 53, 55, etc. may then be adjusted to establish the required shift of antenna current of any given transmitter relative to the phase of a preceding transmitter. Additional circuitry for low level samplings of any transmitter output current may also be fed back to phase comparators at preceding transmitters to assure phase locking. The general pattern so obtained produces a contour such as is shown in FIG. 10, in which the individual patterns of six circularly arrayed elements and the resultant pattern are illustrated. Such a radiating system is applicable in areas and for purposes not related to hardened systems, but where omnidirectional coverage is desired. Moreover, the use of reflectors or directors with the primary radiators is helpful in enhancing and intensifying radiation in all directions.

Figure 12:
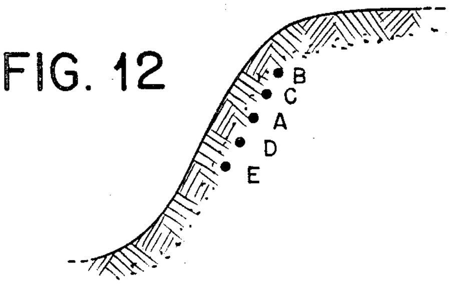
FIG. 12 is a view at right angles to FIG. 11.

FIGS. 11 and 12 illustrate an embodiment of the invention in which the advantages previously described may be retained, but where the particular mountain configuration makes the use of a broadside array of antennas possible. In this instance a generally horizontally disposed antenna dipole element A is embedded in a bluff having a sloping surface. Also embedded in the bluff are additional driven dipoles B, C, D and E to complete the broadside array. As in previously described embodiments, medium surrounding the elements is rock and substantially the same considerations of depth of embedment and feeding of energy to the elements obtain.

The broadside array will produce a radiation pattern in the rock sub-surface which is directed toward the surface slope and has directivity in both orthogonal planes perpendicular to the plane of the array. Refraction at the surface interface will alter the pattern as discussed above, and the slope of the array may be correlated with the surface slope to yield near-maximal radiation vectors at small angles to the horizontal.

Although what has been disclosed constitutes preferred embodiments of the present invention, various modifications within the purview of the invention will suggest themselves to those skilled in the art upon their consideration of the foregoing disclosure. By way of example, the use of natural mountains, bluffs, and the like, has been emphasized, but other earth masses composed largely of rock may be used. An obvious substitution would be a quarry or ledge modified by natural or human agencies. The invention should not be limited to the details of the foregoing disclosure, but only by the spirit and scope of the appended claims.

I claim:

1. An underground antenna in a mountain or large hill having a rock sub-surface and a surface slope greater than about 10° in a desired azimuth direction which comprises a resonant antenna in said rock sub-surface, the depth of said antenna being at least approximately one-tenth wavelength in the medium at the operating frequency, the electrically conductive surface of said antenna being closely adjacent said sub-surface rock in close coupling relationship therewith, said antenna having a position and orientation predetermined to yield a radiation pattern having a major lobe directed toward said surface slope and a refracted beam in air having near-maximal radiation vectors at small angles to the horizontal in said desired direction.

2. An antenna in accordance with claim 1 in which said conductive surface is substantially in contact with said sub-surface rock.

3. An antenna in accordance with claim 1 in which said antenna includes a plurality of side-by-side dipoles forming a dipole array having a radiation pattern in said rock sub-surface which is substantially directive in planes orthogonal to the plane of the array and respectively parallel to said dipoles and perpendicular thereto.

4. An underground antenna in a mountain or large hill having a rock sub-surface and a surface slope greater than about 10° in a desired azimuth direction which comprises a resonant dipole antenna in said rock sub-surface extending in the direction of said slope, the depth of said antenna being at least approximately one-tenth wavelength in the medium at the operating frequency, the electrically conductive surface of said dipole being closely adjacent said sub-surface rock in close coupling relationship therewith, said antenna having a position and orientation predetermined to yield a radiation pattern having a major lobe directed toward said surface slope and a refracted beam in air having near-maximal radiation vectors at small angles to the horizontal in said desired direction.

5. An antenna in accordance with claim 4 in which said conductive surface of the dipole is substantially in contact with said sub-surface rock.

6. An antenna in accordance with claim 4 in which said dipole is inclined to the horizontal at approximately the same angle as the general angle of said surface slope.

7. An antenna in accordance with claim 4 in which the area of said surface slope and the position and orientation of said antenna are correlated to yield an emergence zone of high relative field strength at the surface which is within said surface slope.

8. An antenna in accordance with claim 7 in which said emergence zone is above the terrain in said desired direction of radiation.

9. An antenna in accordance with claim 4 in which said antenna includes a plurality of side-by-side dipoles forming a dipole array having a radiation pattern in said rock sub-surface which is substantially directive in planes orthogonal to the plane of the array and respectively parallel to said dipoles and perpendicular thereto.

References Cited

UNITED STATES PATENTS

| | | | |
|---|---|---|---|
| 2,638,588 | 5/1953 | Riblet | 343—753 |
| 3,183,510 | 5/1965 | Rawls | 343—719 |

OTHER REFERENCES

Burrows: Radio Communication Within the Earth's Crust, IEEE Transactions on Antennas and Prophgation, vol. HP11, May 1963, pages 311–317 relied on.

Carolan et al.: Radio Waves in Rock, IEEE Transactions on Antenna's and Prophgation, vol. HP11, May 1963, pages 336–338 relied on.

ELI LIEBERMAN, *Primary Examiner.*

HERMAN KARL SAALBACH, *Examiner.*